US012157546B2

(12) United States Patent
Dokken et al.

(10) Patent No.: US 12,157,546 B2
(45) Date of Patent: Dec. 3, 2024

(54) APPARATUS FOR DETERMINING AN OPTIMAL ROUTE OF A MARITIME SHIP

(71) Applicants: Offshore Navigation Limited, The Valley (AI); G.M.S. Global Maritime Services Ltd., London (GB)

(72) Inventors: Sverre Dokken, Monaco (MC); Kris Lemmens, Larnaca (CY); Waqas Ahmed Qazi, Islamabad (PK); Jorgen Grindevoll, Sabaneta Antioquia (CO); Alexis Michael, Limassol (CY); Reidulf Maalen, Las Vegas, NV (US); Hans Lennart Cederberg, Norrköping (NO)

(73) Assignee: Offshore Navigation Limited ; G.M.S. Global Maritime Services Ltd., London (GB)

( * ) Notice: Subject to any disclaimer, the term of this patent is extended or adjusted under 35 U.S.C. 154(b) by 698 days.

(21) Appl. No.: 17/282,271

(22) PCT Filed: Oct. 4, 2019

(86) PCT No.: PCT/EP2019/076964
§ 371 (c)(1),
(2) Date: Apr. 1, 2021

(87) PCT Pub. No.: WO2020/070312
PCT Pub. Date: Apr. 9, 2020

(65) Prior Publication Data
US 2021/0371065 A1      Dec. 2, 2021

(30) Foreign Application Priority Data
Oct. 5, 2018   (EP) ..................................... 18198958

(51) Int. Cl.
*B63B 79/40*   (2020.01)
*B63B 49/00*   (2006.01)
(Continued)

(52) U.S. Cl.
CPC .............. *B63B 79/40* (2020.01); *B63B 49/00* (2013.01); *G01C 21/203* (2013.01); *G06F 16/29* (2019.01); *G06Q 10/047* (2013.01)

(58) Field of Classification Search
CPC ......... B63B 79/40; B63B 49/00; B63B 79/00; B63J 99/00; G01C 21/203; G06F 16/29; G06Q 10/047
See application file for complete search history.

(56) References Cited

U.S. PATENT DOCUMENTS

2008/0255757 A1* 10/2008 Bruce .................... G01C 21/20
701/423
2009/0271054 A1* 10/2009 Dokken ............... G01C 21/005
701/21

(Continued)

FOREIGN PATENT DOCUMENTS

WO     WO 2011/055512 A1     5/2011

OTHER PUBLICATIONS

Xiaogang Li et al: "Multi-objective optimization in ship weather routing" 2017 Constructive Nonsmooth Analysis and Related Topics (Dedicated to the Memory of V. F. Demyanov) (CNSA), May 1, 2017 (May 1, 2017), pp. 1-4, XP055573984, DOI: 10.1109/CNSA. 2017.7973982, ISBN: 978-1-5090-6260-7.

(Continued)

*Primary Examiner* — Calvin Cheung
(74) *Attorney, Agent, or Firm* — Holland & Hart LLP (57) ABSTRACT

An apparatus for determining an optimal route of a maritime ship includes a database configured to store at least one optimization constraint parameter, wherein the at least one (Continued)

optimization constraint parameter includes a constant shaft power of the propel shaft of the maritime ship; and a processor configured to execute a multi-objective route optimization based on the departure location, the destination location, and the at least one optimization constraint parameter to obtain the optimal route of the maritime ship.

19 Claims, 3 Drawing Sheets (51) Int. Cl.
    *G01C 21/20*     (2006.01)
    *G06F 16/29*     (2019.01)
    *G06Q 10/047*     (2023.01)

(56) References Cited

U.S. PATENT DOCUMENTS

| | | | | |
|---|---|---|---|---|
| 2010/0168942 | A1* | 7/2010 | Noffsinger | G05D 1/0206 715/764 |
| 2010/0280750 | A1* | 11/2010 | Chen | G01C 21/22 701/465 |
| 2012/0277941 | A1 | 11/2012 | Noffsinger et al. | |
| 2013/0124088 | A1* | 5/2013 | Bruce | G01C 21/203 701/527 |
| 2014/0180566 | A1* | 6/2014 | Malhotra | G08G 3/02 340/984 |
| 2014/0200806 | A1* | 7/2014 | Carnevali | G01C 21/203 701/533 |

OTHER PUBLICATIONS

Motte R et al: "A Computerised On-Board Weather Routeing (CWR) System", Proceedings of the Summer Computer Simulation Conference, xx. xx, Jul. 18, 1999 (Jul. 18, 1999), pp. 812-817, XP000865836.

Ming-Chung Fang et al: "The optimization of ship weather-routing algorithm based on the composite influence of multi-dynamic elements (II): Optimized routings", Applied Ocean Research, vol. 50, Feb. 2, 2015 (Feb. 2, 2015), pp. 130-140, XP055573976, Amsterdam, NL, ISSN: 0141-1187, DOI: 10.1016/j.apor.2014.12.005 sections 1, 2, 3, 3.2, 4, table 1.

Yu-Hsien Lin et al: "The optimization of ship weather-routing algorithm based on the composite influence of multi-dynamic elements", Applied Ocean Research, vol. 43, Oct. 1, 2013 (Oct. 1, 2013), pp. 184-194, XP055573980, Amsterdam, NL ISSN: 0141-1187, DOI: 10.1016/j.apor.2013.07.010, figures 3, 4, section 3.

Laura Walther et al: "Modeling and Optimization Algorithms in Ship Weather Routing", International Journal of E-Navigation and Maritime Economy, vol. 4, Jun. 1, 2016 (Jun. 1, 2016), pp. 31-45, XP055573985, ISSN: 2405-5352, DOI: 10.1016/j.enavi.2016.06.004, sections 2-4, section 4.3.

Erik Larsson et al: "Direct Weather Routing Master's Thesis within the International Master's Programme Naval Architecture and Ocean Engineering & the Nordic Master in Maritime Engineering", Dec. 31, 2014 (Dec. 31, 2014), XP055611738, Retrieved from the Internet: URL:http://publications.lib.chalmers.se/records/fulltext/205858/205858.pdf [retrieved on Aug. 8, 2019], sections 1.1, 4.2, 4.2.4, 4.1.3, sections 3.1.3, 5.1, 2.2.4 section 7.1, figures 2.1, 5.1, table 2.2.

PCT Notification of Transmittal of the International Search Report and the Written Opinion of the International Searching Authority or the Declaration, European Patent Office, PCT/ISA/220, (Jul. 2017), Date of Mailing (Nov. 29, 2019), 21 pages.

Søren Vinther Hansen et al., Performance Monitoring of Ships, DTU Library, Publication Date 2012, Technical University of Denmark, 214 pages.

European Search Report, Pursuant to Rule 62 EPC, Aug. 19, 2021, EPO Germany, 16 pages.

European Search Report, Pursuant to Rule 64 EPC, May 19, 2014, EPO Germany, 16 pages.

European Search Report, Communication under Rule 71(3) EPC, Feb. 26, 2021, EPO Germany, 26 pages.

\* cited by examiner

APPARATUS FOR DETERMINING AN OPTIMAL ROUTE OF A MARITIME SHIP

CROSS-REFERENCE

This application is the U.S. national phase entry of International Application No. PCT/EP2019/076964, filed Oct. 4, 2019, entitled "AN APPARATUS FOR DETERMINING AN OPTIMAL ROUTE OF A MARITIME SHIP," which claims the benefit of European Application Number 18198958.3, filed Oct. 18, 2018, entitled "AN APPARATUS FOR DETERMINING AN OPTIMAL ROUTE OF A MARITIME SHIP." These applications are incorporated herein by reference.

TECHNICAL FIELD

The present disclosure relates to the field of maritime route planning. In particular, the present disclosure relates to Power Route Optimisation (PRO).

BACKGROUND

Conventional maritime route optimization algorithms often follow similar estimation procedures to determine a ship's optimal sailing route in terms of courses and speeds that need to be achieved to reach a destination at a specific time.

Firstly, waypoints or grids along a ship's voyage area are generated, and candidate routes in terms of trajectories with associated speeds are constructed. Then, the optimal route from those candidates is determined with respect to a specific optimization objective, such as shortest sailing time or a minimum fuel consumption based on either a required arrival time or an instructed speed and fuel consumption.

However, conventional maritime route optimization algorithms relying on such optimization objectives and considering conventional optimization constraint parameters are typically associated with tradeoffs. For example, using either the shortest sailing time or a fixed required arrival time as an optimization constraint parameter may be associated with an increased fuel consumption. Using the minimum fuel consumption as an optimization objective at a predetermined fixed required arrival time or a certain allowed speed interval as an optimization constraint parameter may be associated with an increased risk for exceeding the maximum limits for accelerations and motions of the maritime ship with respect to cargo safety and or fatigue.

SUMMARY

It is an object of the present disclosure to provide an improved apparatus for determining an optimal route of a maritime ship according to the needs of the user and the thresholds inserted, which might include, but not limited to, the fastest, shortest, most comfortable or the most economic route. These might dependent on the thresholds the end user has inserted, and such an example might be the nature of the cargo.

This object is achieved by the features of the independent claims. Further implementation forms are apparent from the dependent claims, the description and the figures.

The present disclosure is based on the finding that a shaft power of a propel shaft of a maritime ship is directly related to a power efficiency of the maritime ship, and that any acceleration and/or deceleration of the maritime ship is typically associated with losses in efficiency. When executing any route optimization algorithm to obtain an optimal route between a departure location and a destination location, it has been found to be advantageous to use at least a predetermined constant shaft power of the propel shaft of the maritime ship as an optimization constraint parameter; thereby allowing for an increase in power efficiency of the maritime ship during its voyage between the predetermined departure location and the predetermined destination location. Furthermore, a reduction in fuel consumption of the maritime ship during its voyage between the predetermined departure location and the predetermined destination location may be achieved.

The concept may advantageously be applied for maritime route planning for any kind of maritime ship, independent of cargo sensitivity as well as how the maritime ship is instructed, e.g. a liner service instructed with a specific required arrival time or a maritime ship that is only instructed to remain on a certain speed or fuel consumption due to the nature of their cargo like crude oil, grain, or other non-sensitive cargo, this is known as tramp shipping. The predetermined departure location and the predetermined destination location may relate to the complete route of the maritime ship from a departure port to a destination port. However, the predetermined departure location and the predetermined destination location may alternatively relate to intermediate locations between the departure port and the destination port for planning only a section of the route.

According to a first aspect, the present disclosure relates to an apparatus for determining an optimal route of a maritime ship, wherein the maritime ship is to depart at a predetermined departure location, wherein the maritime ship is to arrive at a predetermined destination location, and wherein the maritime ship is using propulsion to move ahead. The apparatus comprises a database configured to store at least one optimization constraint parameter, wherein the aforementioned, at least one optimization constraint parameter comprises a predetermined constant shaft power of the propel shaft of the maritime ship. An optimal route can be calculated both with respect to the best geographical route, that is, which waypoints are to be selected and which courses the ship is sailing) as well as the best engine setting (or speed profile), expressed preferably in kW delivered to the propeller, hence the shaft power, to be selected along the route. Hence it may sometimes be clever to increase or reduce speed in order to avoid bad weather or catch the tide. The apparatus further comprises a processor configured to execute a route optimization algorithm based on the predetermined departure location, the predetermined destination location, and the at least one optimization constraint parameter in order to obtain the optimal route of the maritime ship.

In relation to this, an optimal route may not always have one single average engine setting throughout a voyage (how many kW used for propulsion, hence going out to the propeller). In some cases, the most optimal may be to have a few variational engine settings. This includes but is not limited to adjusting the speed to avoid bad weather, temporarily decrease the speed if the ship enters shallow waters, decrease the speed in the Emission Control Area (ECA) zone due to higher fuel prices, adjust speed inside/outside ECA zone due to lack of sufficient amount of low Sulphur fuel, adjust speed in other environmental areas (such as whale areas), increase speed in High Risk Areas (HRA) due to safety. These are some of the threshold that can be inserted in the algorithms to perform the optimal route according to the needs of the user.

In an example, the multi-objective route optimization algorithm may comprise, at least one, but it can also be a combination, of the following algorithms: an isochrone algorithm, an isopone algorithm, a dynamic programming algorithm, a 3D dynamic programming algorithm, a Dijkstra algorithm, or a genetic algorithm. Thus, different well-established algorithms may be applied; thereby allowing for an efficient implementation of the apparatus.

The isochrone algorithm may e.g. be based on the work of Hagiwara H., "Weather routing of (sail-assisted) motor vessels," PhD thesis, Delft University of Technology, 1989. The isopone algorihm may e.g. be based on the work of Klompstra M. B. et al., "The isopone method in optimal control," Dynamics and Control, 2(3): 281-301, 1992. The dynamic programming algorithm may e.g. be based on the work of De Wit C., "Proposal for low cost ocean weather routeing," Journal of Navigation, 43(3): 428-439, 1990. The 3D dynamic programming algorithm may e.g. be based on the work of Shao W. and Zhou P., "Development of a 3D Dynamic Programming Method for Weather Routing," International Journal on Marine Navigation and Safety of Sea Transportation, Volume 6, No. 1, 2012. The Dijkstra algorithm may e.g. be based on the work of Dijkstra E. W., "A note on two problems in connexion with graphs," Numerische Mathematik, Vol. 1, pp. 269-271, 1959. The genetic algorithm may e.g. be based on the work of Maki A., "A new weather-routing system that accounts for ship stability based on a real-coded genetic algorithm," Journal Maritime Science Technology, 16:311-322, 2011.

In an example, the database is further configured to store a predetermined ship performance model, wherein the processor is further configured to execute the route optimization algorithm further based on the predetermined ship performance model. Thus, characteristics of the maritime ship may efficiently be considered in the execution of the multi-objective route optimization algorithm.

In an example, the predetermined ship performance model indicates at least one of the following parameters: a maximum speed of the maritime ship, a range of the maritime ship, a water resistance of the maritime ship, in particular a calm water resistance of the maritime ship, a wave resistance of the maritime ship, a wind resistance of the maritime ship, a fouling resistance of the maritime ship, and/or a resistance due to the squat effect. Thus, characteristics of the maritime ship may efficiently be considered in the execution of the multi-objective route optimization algorithm.

The squat effect is a hydrodynamic phenomenon by which the maritime ships' speed will be reduced (depending on draft and speed interval) when sailing in shallow water. Water which flows freely under a ship given sufficient room becomes restricted in its flow when there is insufficient space between a ship's hull and the seabed. Such will increase the resistance experienced by the ship from the water and thus this squat effect in shallow water must be considered as one parameter in the optimization.

In an example, the database is further configured to store predetermined bathymetry information, wherein the processor is further configured to execute the route optimization algorithm further based on the predetermined bathymetry information. Thus, bathymetric parameters may efficiently be considered in the execution of the multi-objective route optimization algorithm.

In an example, the predetermined bathymetry information indicates at least one of the following bathymetric parameters: a water depth, or a land contour. Thus, sellable areas of the maritime ship may efficiently be considered in the execution of the multi-objective route optimization algorithm.

In an example, the database is further configured to store predetermined metocean information, wherein the processor is further configured to execute the route optimization algorithm further based on the predetermined metocean information. Thus, metocean parameters may efficiently be considered in the execution of the multi-objective route optimization algorithm.

In an example, the predetermined metocean information indicates at least one of the following metocean parameters: a wind direction, a wind speed, a current direction, a current speed, a wave height, in particular a significant wave height or a maximum wave height, a wave period, a wave propagation direction, and/or a wave spectrum. Thus, metocean conditions influencing the power efficiency of the maritime ship may efficiently be considered in the execution of the multi-objective route optimization algorithm.

In an example, the processor is further configured to execute the multi-objective route optimization algorithm further based on at least one, or a combination, of the following optimization objectives: a minimum estimated time of arrival of the maritime ship, a minimum power consumption of the maritime ship, a minimum fuel consumption of the maritime ship, a minimum emission of the maritime ship, in particular a minimum $CO_2$, $SO_x$, $NO_x$ or PM emission of the maritime ship, a minimum risk of motions of the maritime ship, and/or a minimum fatigue damage in the structure of the maritime ship. Thus, different optimization objectives may be considered in the execution of the multi-objective route optimization algorithm.

By minimizing the risk of motions of the maritime ship, the risk of cargo loss and/or structural stress in the structure of the maritime ship may be reduced or minimized. Furthermore, maintenance intervals may be increased and/or safety risks may be reduced.

In an example, the processor is further configured to generate a graph comprising a plurality of nodes and a plurality of edges based on the predetermined departure location and the predetermined destination location, and to execute the route optimization algorithm further based on the graph. Thus, the multi-objective route optimization algorithm may efficiently be executed.

Each node of the plurality of nodes may be associated with a respective location, e.g. a respective longitude and a respective latitude. Each edge of the plurality of edges may be associated with a pair of nodes of the plurality of nodes.

In an example, each edge of the plurality of edges is associated with a respective optimization cost. Thus, the multi-objective route optimization algorithm may efficiently be executed.

The respective optimization cost may e.g. be one of the following optimization costs: a voyage time of the maritime ship associated with a respective pair of nodes, a power consumption of the maritime ship, a fuel consumption of the maritime ship, an emission of the maritime ship, in particular a $CO_2$, $So_x$, $NO_x$, or PM emission of the maritime ship, a risk of motions of the maritime ship, and/or a fatigue damage in the structure of the maritime ship. The processor may be configured to execute the multi-objective route optimization algorithm further based on the respective optimization costs of the plurality of edges.

The risk of motions of the maritime ship may be associated with a risk of cargo loss and/or structural stress in the structure of the maritime ship. These risks may further relate to maintenance intervals and/or safety risks.

In an example, the apparatus further comprises a communication interface configured to transmit navigational data over a communication network, wherein the navigational data indicates the optimal route of the maritime ship. Thus, the optimal route of the maritime ship may e.g. be determined by onshore and may be signaled to a navigational system onboard the maritime ship.

In an example, the navigational data further indicates the predetermined constant shaft power. Thus, the predetermined constant shaft power used for determining the optimal route of the maritime ship onshore may also be signaled to the navigational system onboard the maritime ship.

According to a second aspect, the present disclosure relates to a method for operating an apparatus for determining an optimal route of a maritime ship, wherein the maritime ship is to depart at a predetermined departure location, wherein the maritime ship is to arrive at a predetermined destination location, and wherein the maritime ship is to is using propulsion to move ahead. The apparatus comprises a database and a processor, wherein the database is configured to store at least one optimization constraint parameter, wherein at least one optimization constraint parameter comprises a predetermined constant shaft power of the propel shaft of the maritime ship. The method comprises executing, by the processor, a route optimization algorithm based on the predetermined departure location, the predetermined destination location, and the at least one optimization constraint parameter in order to obtain the optimal route of the maritime ship.

The method may be performed by the apparatus. Further features of the method directly result from the features or the functionality of the apparatus.

According to a third aspect, the present disclosure relates to a computer program comprising a program code for performing the method when executed by a processor.

The principles of the present disclosure can be implemented in hardware and/or software.

BRIEF DESCRIPTION OF THE FIGURES

Examples of the principles of the present disclosure will be described with respect to the following figures, in which.

DETAILED DESCRIPTION OF THE FIGURES

Figure 1:
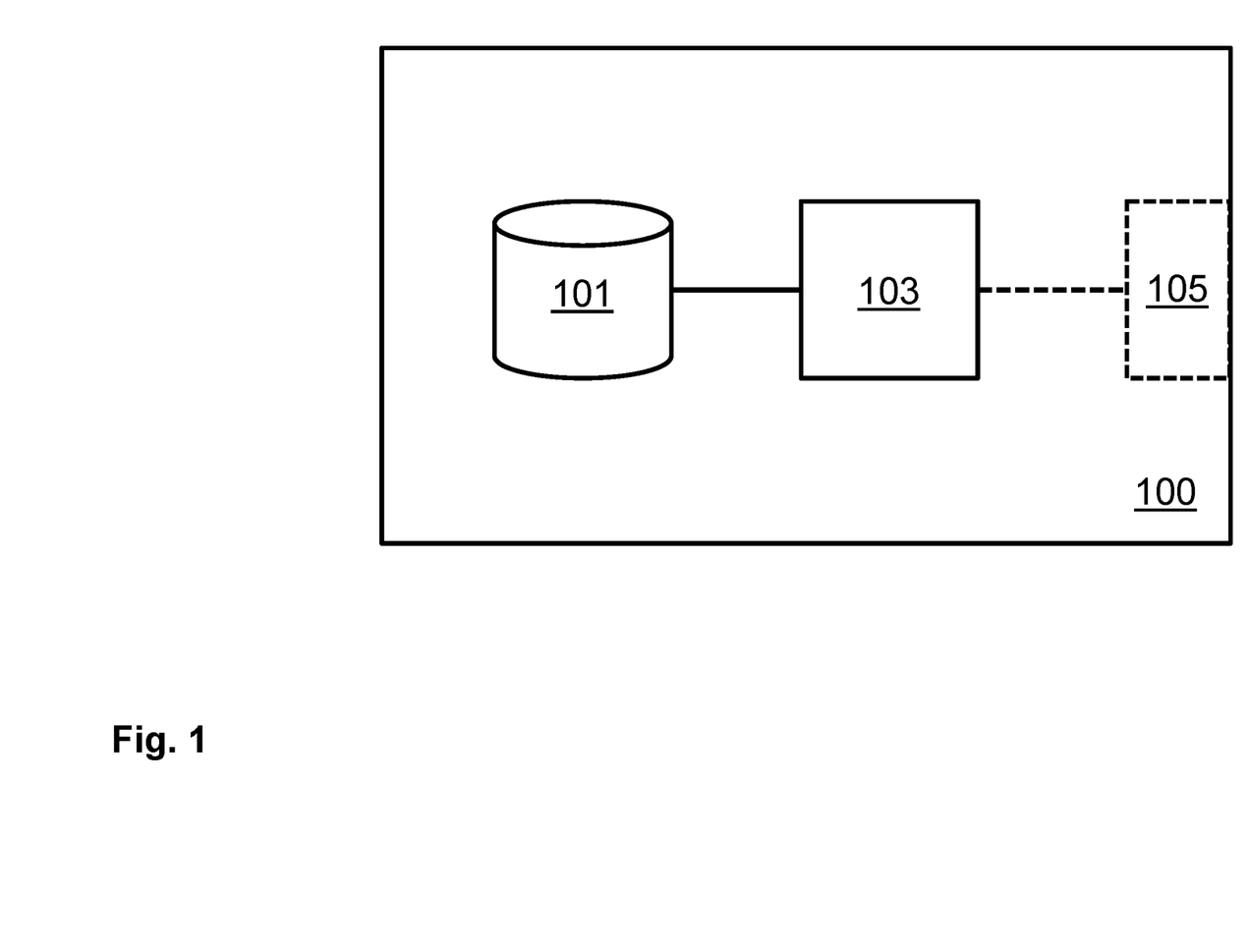
FIG. 1 shows a schematic diagram of an apparatus for determining an optimal route of a maritime ship.

FIG. 1 shows a schematic diagram of an apparatus 100 for determining an optimal route of a maritime ship, wherein the maritime ship is to depart at a predetermined departure location, wherein the maritime ship is to arrive at a predetermined destination location, and wherein the maritime ship is using propulsion to move ahead. The apparatus 100 comprises a database 101 configured to store at least one optimization constraint parameter, wherein the at least one optimization constraint parameter comprises a predetermined constant shaft power of the propel shaft of the maritime ship. The apparatus 100 further comprises a processor 103 configured to execute a multi-objective route optimization algorithm based on the predetermined departure location, the predetermined destination location, and the at least one optimization constraint parameter in order to obtain the optimal route of the maritime ship. The apparatus 100 may further comprise a communication interface 105 configured to transmit navigational data over a communication network, wherein the navigational data indicates the optimal route of the maritime ship. The navigational data may further indicate the predetermined constant shaft power. The apparatus 100 may be located onboard the maritime ship or onshore.

The multi-objective route optimization algorithm may comprise at least one, or a combination of the following algorithms: an isochrone algorithm, an isopone algorithm, a dynamic programming algorithm, a 3D dynamic programming algorithm, a Dijkstra algorithm, or a genetic algorithm. The route optimization algorithm may comprise only one or an arbitrary combination of the mentioned algorithms.

The processor 103 may further be configured to execute the multi-objective route optimization algorithm further based on at least one, or a combination, of the following optimization objectives: a minimum estimated time of arrival of the maritime ship, a minimum power consumption of the maritime ship, a minimum fuel consumption of the maritime ship, a minimum emission of the maritime ship, in particular a minimum $CO_2$, Sox, NOx, or PM emission of the maritime ship, a minimum risk of motions of the maritime ship, and/or a minimum fatigue damage in the structure of the maritime ship. By minimizing the risk of motions of the maritime ship, the risk of cargo loss and/or structural stress in the structure of the maritime ship may be reduced or minimized. Furthermore, maintenance intervals may be increased and/or safety risks may be reduced. The route optimization may be performed by the processor 103 with regard to any of the mentioned optimization objectives while considering the predetermined constant shaft power of the propel shaft as an optimization constraint parameter.

The database 101 may further be configured to store a predetermined ship performance model, wherein the processor 103 may further be configured to execute the multi-objective route optimization algorithm further based on the predetermined ship performance model. The predetermined ship performance model may indicate at least one of the following parameters: a maximum speed of the maritime ship, a range of the maritime ship, a water resistance of the maritime ship, in particular a calm water resistance of the maritime ship, a wave resistance of the maritime ship, a wind resistance of the maritime ship, a fouling resistance of the maritime ship, and/or a resistance due to the squat effect. The predetermined ship performance model may indicate the performance of the maritime ship. The communication interface 105 may be configured to receive the predetermined ship performance model over the communication network.

The database 101 may further be configured to store predetermined bathymetry information, wherein the processor 103 is further configured to execute the multi-objective route optimization algorithm further based on the predetermined bathymetry information. The predetermined bathymetry information may indicate at least one, or a combination, of the following bathymetric parameters: a water depth, or a land contour. The predetermined bathymetry information may indicate bathymetric conditions of candidate routes of the maritime ship between the predetermined departure location and the predetermined destination location. The communication interface 105 may be configured to receive the predetermined bathymetry information over the communication network.

The database 101 may further be configured to store predetermined metocean information, wherein the processor 103 is further configured to execute the multi-objective route optimization algorithm further based on the predetermined metocean information. The predetermined metocean information may indicate at least one, or a combination, of the following metocean parameters: a wind direction, a wind speed, a current direction, a current speed, a wave height, in particular a significant wave height or a maximum wave height, a wave period, a wave propagation direction, and/or a wave spectrum. The predetermined metocean information may indicate metocean conditions of candidate routes of the maritime ship between the predetermined departure location and the predetermined destination location. The communication interface 105 may be configured to receive the predetermined metocean information over the communication network.

Figure 2:
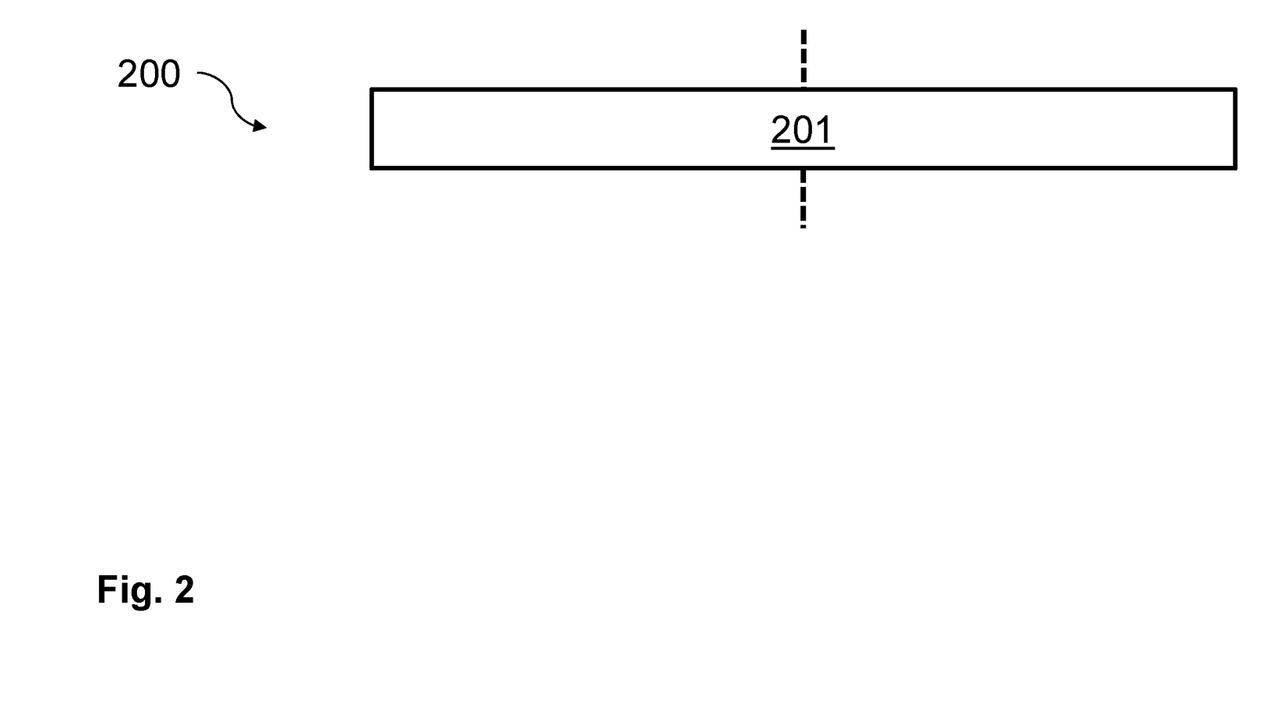
FIG. 2 shows a schematic diagram of a method for operating an apparatus for determining an optimal route of a maritime ship.

FIG. 2 shows a schematic diagram of a method 200 for operating an apparatus for determining an optimal route of a maritime ship, wherein the maritime ship is to depart at a predetermined departure location, wherein the maritime ship is to arrive at a predetermined destination location, and wherein the maritime ship is using propulsion to move ahead. The apparatus comprises a database and a processor, wherein the database is configured to store at least one optimization constraint parameter, wherein the at least one optimization constraint parameter comprises a predetermined constant shaft power of the propel shaft of the maritime ship. The method 200 comprises executing 201, by the processor, a multi-objective route optimization algorithm based on the predetermined departure location, the predetermined destination location, and at least one or a combination of the optimization constraint parameters in order to obtain the optimal route of the maritime ship. The method 200 may be performed by a computer program comprising a program code to be executed by a processor.

Figure 3:
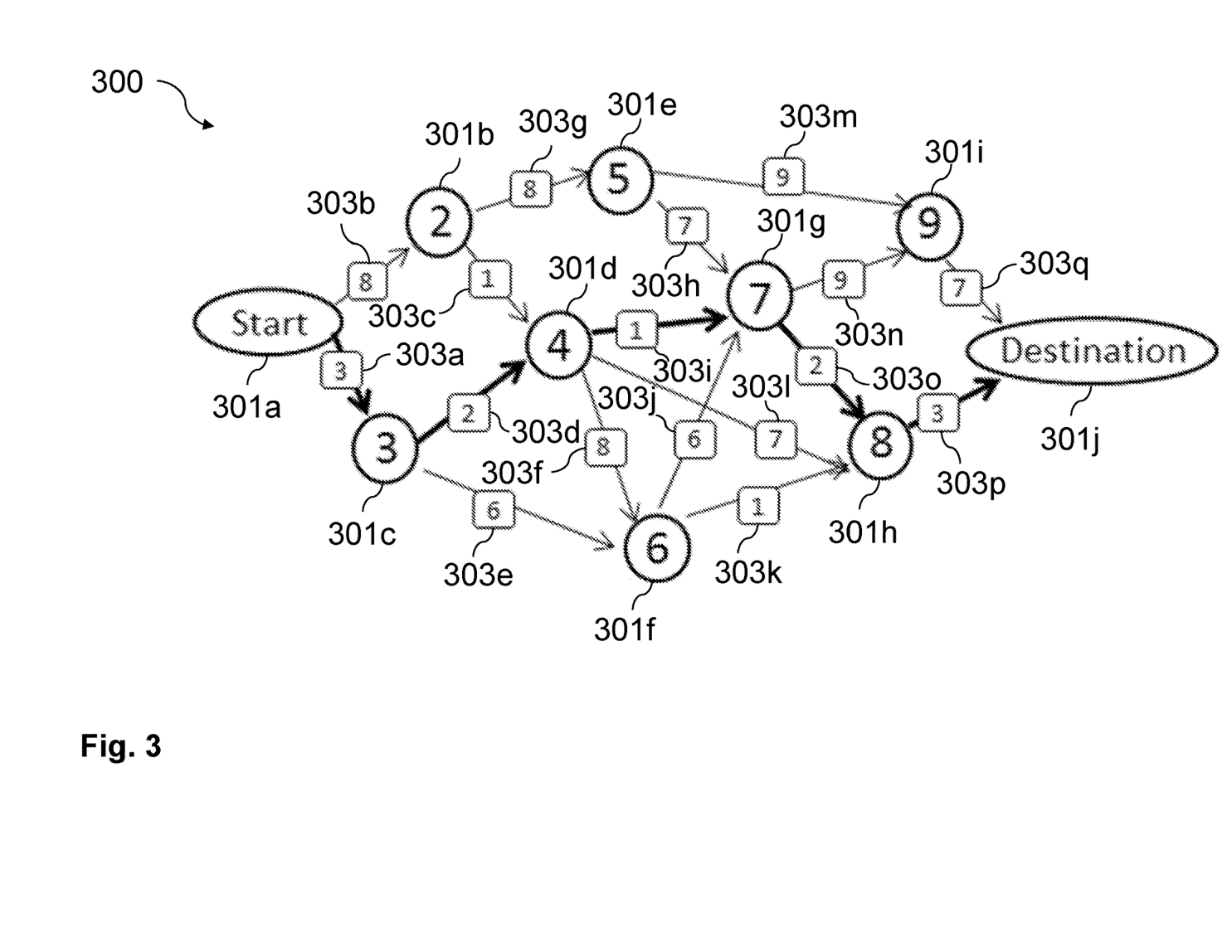
FIG. 3 shows a schematic diagram of a graph having a plurality of nodes and a plurality of edges.

FIG. 3 shows a schematic diagram of a graph 300 having a plurality of nodes 301$a$-$j$ and a plurality of edges 303$a$-$q$. The graph 300 may be generated by the processor based on the predetermined departure location and the predetermined destination location.

Each node of the plurality of nodes 301$a$-$j$ may be associated with a respective location, e.g. a respective longitude and a respective latitude. Each edge of the plurality of edges 303$a$-$q$ may be associated with a pair of nodes of the plurality of nodes 301$a$-$j$. Each edge of the plurality of edges 303$a$-$q$ may be associated with a respective optimization cost, e.g. a power consumption of the maritime ship, a fuel consumption of the maritime ship, a risk of maximum motions of the maritime ship, or a fatigue damage in the structure of the maritime ship. The processor may execute multi-objective route optimization algorithm, including e.g. a Dijkstra algorithm, based on the graph 300.

In summary, the route of a maritime ship can be optimized for different optimization objectives in accordance with the multi-objective route optimization algorithm. For example, a minimum estimated time of arrival (ETA) of the maritime ship at a predetermined constant speed as an optimization constraint parameter, or a minimum fuel consumption or a minimum emission of the maritime ship at a predetermined fixed ETA as an optimization constraint parameter. Furthermore, route optimization with regard to a minimum risk of motions of the maritime ship, or a minimum fatigue damage in the structure of the maritime ship, e.g. due to an interaction with certain heavy wave patterns, may be performed. A substantial improvement may be realized using an optimization considering a predetermined constant shaft power as an optimization constraint parameter. This means that a captain of the maritime ship may choose a specific setting of the shaft power of the propel shaft, which may be connected to the propeller of the maritime ship, and might not change the setting of the shaft power for the entire voyage of the maritime ship.

Depending on the metocean conditions, the maritime ship may speed up, e.g. in case of favorable winds, currents, and/or waves, or slow down, e.g. in case of unfavorable winds, currents, and/or waves, due to the metocean conditions. Since the metocean conditions may be predicted, and the ship performance model may provide the maritime ship's speed under those conditions at certain shaft powers, it may be possible to calculate which shaft power may generate a sufficient overall speed in order to complete the voyage within a desired time. Once the needed shaft power is known, the needed engine power and the needed fuel to produce this engine power may also be known. In an example, the needed shaft power is used as predetermined constant shaft power for route optimization.

Since maritime ships may need more power than for movement only, e.g. power for heating, cooling, lighting, operating cranes, and/or pumping water, the shaft power may not be equal to the overall power consumption of the maritime ship as the latter may be higher than what is needed solely for generating shaft power.

The ship performance model may e.g. indicate at least one of the following parameters: a maximum speed of the maritime ship, a range of the maritime ship, a water resistance of the maritime ship, in particular a calm water resistance of the maritime ship, a wave resistance of the maritime ship, a wind resistance of the maritime ship, a fouling resistance of the maritime ship, and/or a resistance due to the squat effect. The ship performance model may further be refined e.g. using machine learning which may process the performance and behavioral data, e.g. 6 degrees of motion, of the maritime ship over many of its voyages in order to improve the parameterization of the ship performance model. Using machine learning, it may also be possible to understand and additionally model the additional and overall power needs that may not be strictly related to generating shaft power. However, the additional power needs, e.g. due to onboard appliances, may have no influence on the predetermined constant shaft power for route optimization which is why it is a suitable optimization constraint parameter by which to determine an optimal route of the maritime ship. The additional power needs may only influence the overall fuel consumption of the maritime ship.

If, for example, a voyage is optimized for a predetermined constant speed, a captain may have to actively increase or reduce the throttle whenever the maritime ship enters different favorable and/or unfavorable metocean conditions as to keep the maritime ship's speed at the suggested value. Operating the maritime ship at a predetermined constant shaft power, however, does not necessitate any actions by the captain as the speeds over the entire voyage using the predetermined constant shaft power may be determined to be overall sufficient for the maritime ship to arrive on time. To achieve this, the bathymetric and/or metocean conditions are preferably considered as well, wherein the metocean conditions may be predicted.

This work has received funding from the EU FP7 Space-Nav project (grant agreement No. 607371) and the EU Horizon2020 EONav project (grant agreement No. 687537).

REFERENCE NUMERALS

100 Apparatus
101 Database
103 Processor

105 Communication interface
200 Method
201 Executing
300 Graph
301a-j Node
303a-q Edge

What is claimed is:

1. An apparatus for determining an optimal route of a maritime ship, wherein the maritime ship is to depart at a departure location, wherein the maritime ship is to arrive at a destination location, and wherein the maritime ship uses propulsion to move ahead, the apparatus comprising:
a database configured to store at least one optimization constraint parameter, wherein the at least one optimization constraint parameter comprises a constant shaft power of a propel shaft of the maritime ship, wherein the database is further configured to store a ship performance model; and
a processor configured to execute a multi-objective route optimization based on the departure location, the destination location, and the at least one optimization constraint parameter and further based on the ship performance model to obtain the optimal route of the maritime ship.

2. The apparatus of claim 1, wherein executing the multi-objective route optimization implements one or more of: an isochrone algorithm, an isopone algorithm, a dynamic programming algorithm, a 3D dynamic programming algorithm, a Dijkstra algorithm, or a genetic algorithm.

3. The apparatus of claim 1, wherein the ship performance model indicates one or more of: a speed of the maritime ship, a range of the maritime ship, a calm water resistance of the maritime ship, a wave resistance of the maritime ship, a wind resistance of the maritime ship, a fouling resistance of the maritime ship, a resistance due to a squat effect of the maritime ship, a resistance due to a motion of the maritime ship, or a voluntary speed reduction due to hard weather.

4. The apparatus of claim 1, wherein the database is further configured to store bathymetry information, and wherein executing the processor is further configured to execute the multi-objective route optimization further based on the bathymetry information.

5. The apparatus of claim 4, wherein the bathymetry information indicates at least one or more of: a water depth, or a land contour.

6. The apparatus of claim 1, wherein the database is further configured to store metocean information, and wherein the processor is further configured to execute the multi-objective route optimization algorithm further based on the metocean information.

7. The apparatus of claim 6, wherein the metocean information indicates one or more of: a wind direction, a wind speed, a current direction, a current speed, a wave height, in particular a significant wave height or a maximum wave height, a wave period, a wave propagation direction, or a wave spectrum.

8. The apparatus of claim 1, wherein the processor is further configured to generate a graph comprising a plurality of nodes and a plurality of edges based on the departure location and the destination location, and to execute the multi-objective route optimization further based on the graph.

9. The apparatus of claim 8, wherein each edge of the plurality of edges is associated with a respective optimization cost.

10. The apparatus of claim 1, further comprising:
a communication interface configured to transmit navigational data over a communication network, wherein the navigational data indicates the optimal route of the maritime ship.

11. The apparatus of claim 10, wherein the navigational data further indicates the constant shaft power.

12. An apparatus for determining an optimal route of a maritime ship, wherein the maritime ship is to depart at a departure location, wherein the maritime ship is to arrive at a destination location, and wherein the maritime ship uses propulsion to move ahead, the apparatus comprising:
a database configured to store at least one optimization constraint parameter, wherein the at least one optimization constraint parameter comprises a constant shaft power of a propel shaft of the maritime ship; and
a processor configured to execute a multi-objective route optimization based on the departure location, the destination location, and the at least one optimization constraint parameter to obtain the optimal route of the maritime ship;
wherein the processor is further configured to execute the multi-objective route optimization further based on one or more of: a minimum estimated time of arrival (ETA) of the maritime ship, a minimum power consumption of the maritime ship, a minimum fuel consumption of the maritime ship, a minimum emission of the maritime ship, in particular a minimum $CO_2$, $SO_x$, $NO_x$, or PM emission of the maritime ship, a minimum risk of motions of the maritime ship, or a minimum fatigue damage in a structure of the maritime ship.

13. A method for operating an apparatus for determining an optimal route of a maritime ship, wherein the maritime ship uses propulsion to move ahead, the method comprising:
obtaining departure location of the maritime ship and, a destination location of the maritime ship;
storing in a database at least one optimization constraint parameter and a ship performance model, wherein the at least one optimization constraint parameter comprises a constant shaft power of the propel shaft of the maritime ship;
executing, by a processor a multi-objective route optimization based on the departure location, the destination location, the at least one optimization constraint parameter, and the ship performance model to obtain the optimal route of the maritime ship.

14. The method of claim 13, wherein executing the multi-objective route optimization implements one or more of: an isochrone algorithm, an isopone algorithm, a dynamic programming algorithm, a 3D dynamic programming algorithm, a Dijkstra algorithm, or a genetic algorithm.

15. The method of claim 14, further comprising:
storing bathymetry information in the database, wherein executing the multi-objective route optimization is further based on the bathymetry information.

16. The method of claim 14, further comprising:
storing metocean information in the database, wherein executing the multi-objective route optimization is further based on the metocean information.

17. A computer readable program product for determining an optimal route of a maritime ship, wherein the maritime ship uses propulsion to move ahead, the computer-readable program product comprising a non-transitory computer-readable medium storing instructions that, when executed by at least one processor, are configured to cause the at least one processor to:
obtain a departure location of the maritime ship and a destination location of the maritime ship;

store in a database at least one optimization constraint parameter and a ship performance model, wherein the at least one optimization constraint parameter comprises a constant shaft power of the propel shaft of the maritime ship; and execute a multi-objective route optimization based on the departure location, the destination location, the at least one optimization constraint parameter, and the ship performance model to obtain the optimal route of the maritime ship.

18. A method for operating an apparatus for determining an optimal route of a maritime ship, wherein the maritime ship uses propulsion to move ahead, the method comprising:

obtaining a departure location of the maritime ship and a destination location of the maritime ship;

storing in a database at least one optimization constraint parameter, wherein the at least one optimization constraint parameter comprises a constant shaft power of a propel shaft of the maritime ship; and executing, by a processor a multi-objective route optimization based on the departure location, the destination location, and the at least one optimization constraint parameter to obtain the optimal route of the maritime ship;

wherein executing the multi-objective route optimization is further based on one or more of: a minimum estimated time of arrival (ETA) of the maritime ship, a minimum power consumption of the maritime ship, a minimum fuel consumption of the maritime ship, a minimum emission of the maritime ship, in particular a minimum $CO_2$, Sox, NOx, or PM emission of the maritime ship, a minimum risk of motions of the maritime ship, or a minimum fatigue damage in a structure of the maritime ship.

19. A computer-readable program product for determining an optimal route of a maritime ship, wherein the maritime ship uses propulsion to move ahead, the computer-readable program product comprising a non-transitory computer-readable medium storing instructions that, when executed by at least one processor, are configured to cause the at least one processor to:

obtain a departure location of the maritime ship and a destination location of the maritime ship;

store in a database at least one optimization constraint parameter, wherein the at least one optimization constraint parameter comprises a constant shaft power of a propel shaft of the maritime ship; and execute a multi-objective route optimization based on the departure location, the destination location, and the at least one optimization constraint parameter to obtain the optimal route of the maritime ship;

wherein the instructions are configured to cause the at least one processor to execute the multi-objective route optimization further based on one or more of: a minimum estimated time of arrival (ETA) of the maritime ship, a minimum power consumption of the maritime ship, a minimum fuel consumption of the maritime ship, a minimum emission of the maritime ship, in particular a minimum of $CO_2$, Sox, NOx, or PM emission of the maritime ship, a minimum risk of motions of the maritime ship, or a minimum fatigue damage in a structure of the maritime ship.

* * * * *